UNITED STATES PATENT OFFICE.

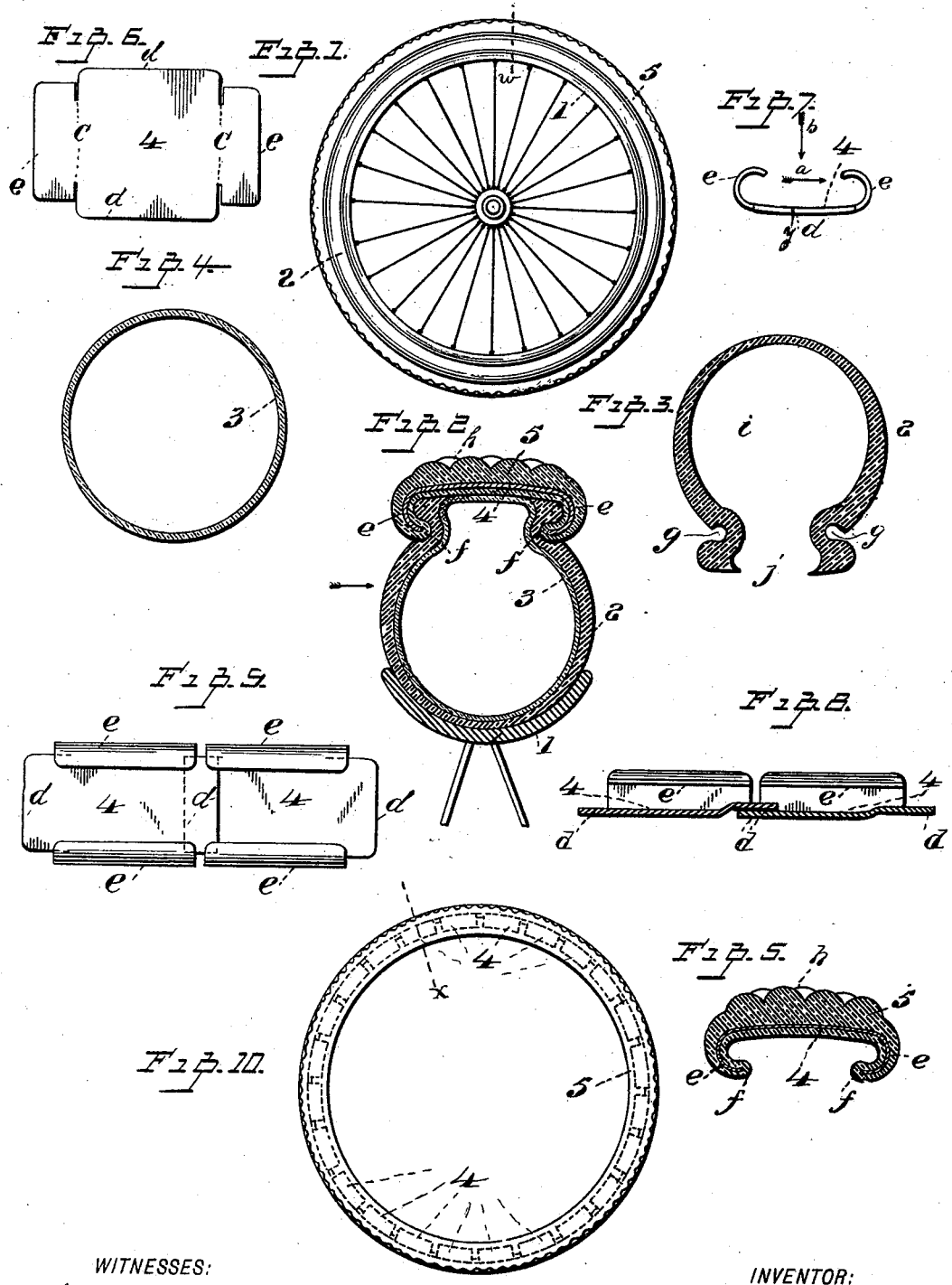

JOSEPH P. LAVIGNE, OF NEW HAVEN, CONNECTICUT, ASSIGNOR OF ONE-HALF TO WILBUR F. DAY, SR., OF SAME PLACE.

BICYCLE-TIRE.

SPECIFICATION forming part of Letters Patent No. 506,179, dated October 3, 1893.

Application filed January 31, 1893. Serial No. 460,198. (No model.)

*To all whom it may concern:*

Be it known that I, JOSEPH P. LAVIGNE, a citizen of the United States, and a resident of New Haven, in the county of New Haven and State of Connecticut, have invented certain new and useful Improvements in Bicycles, of which the following is a specification.

My invention relates to an improvement in bicycle wheels and particularly to that portion connected with the tire, the object and purpose of my improvement being to increase the longevity of the tire in general and particularly the pneumatic tube, which, by means of my peculiar arrangement is not only fully protected but it is also readily and easily removed for the purpose of making repairs or inserting a new one.

To this end my invention consists in cementing or otherwise attaching to the metal rim of the wheel an elastic reinforce holder for the pneumatic tube, which is preferably thicker and heavier than said tube, especially at or near its outer circumferential surface, which is also open at that point for the insertion of the pneumatic tube, and, when such tube is placed therein, the said reinforce holder is surmounted by a circumferential clamping shoe, which shoe not only exerts a closing tendency on the open mouth of the reinforce holder, but it is also the treading surface for the wheel, or, in other words, that surface which engages with the ground. This shoe is made of an elastic substance, preferably rubber, and is made sufficiently thick to stand the necessary wear as well as to perform the functions of a clamp for the reinforce holder and a compressor for the pneumatic tube. To further strengthen this shoe, as well as to protect the pneumatic tube against puncture, short steel sections are vulcanized within the body of the said shoe, whose edges are not firmly connected together but simply lapped by, so as to break joints, thereby preventing intrusion of objects that would puncture the pneumatic tube and yet not interfere with the elasticity of the said shoe. All of which improvements will be more fully described in the following specification and such characteristic features as I believe to be novel and new particularly pointed out in the claims to follow.

To enable others to understand my said invention reference is had to the accompanying drawings and to the figures and letters of reference marked thereon, in which—

Figure 1, represents a side elevation of a bicycle wheel with my improvement mounted thereon. Fig. 2, is a cross section of the outer circumferential portion of the wheel through line *w* of Fig. 1. Fig. 3, is a detail cross section of the reinforce pneumatic tube holder; Fig. 4, a detail cross section of the pneumatic tube. Fig. 5, is a detail cross section of the combined clamping and treading shoe and one of the steel sections through line *x* of Fig. 10. Fig. 6, is a detail plan view of one of the blanks from which the steel sections are formed. Fig. 7, is a detail side elevation of one of the steel sections bent into the proper shape and in readiness to be vulcanized into the rubber shoe. Fig. 8, is a detail and longitudinal cross section of two of the steel sections as they will appear when in position, said view being on the line *y* of Fig. 7, looking in the direction of arrow *a*. Fig. 9, is a detail plan view of two steel sections with their projecting ends lapped together, looking in the direction of arrow *b*, Fig. 7. Fig. 10, is a side elevation of the shoe detached from the reinforce pneumatic tube holder.

Its construction and operation are as follows: 1 represents the metal felly or rim of the wheel, 2 the reinforce pneumatic tube holder cemented or otherwise attached thereto, as shown at Figs. 1 and 2. The upper end of said holder is open as shown in Fig. 3, so that the two sides thereof may be sprung apart to admit the round pneumatic tube 3, shown at Fig. 4. 4 (see Fig. 6) is one of the steel sections, which are about one inch in length and, as before mentioned, are blanked from thin sheet metal. I prefer to provide the kerfs *c*, so that the ends *d*, which are the lapping ends, will come within the curve or circle formed by the ends *e*, when such ends are turned over as shown in Figs. 2, 5 and 7. These short steel sections 4 are arranged as shown in Fig. 8, with their ends lapped, so that when vulcanized in the rubber shoe 5 such ends may slide upon each other and not interfere with the elasticity of said shoe when arranged in a circular form as shown in Fig. 10. It will be observed that the steel sections are fully covered by the rubber shoe, so that the edges $f$ of said shoe will conform to the shape or curve of such curved ends of the steel sections, thus strengthening and enhancing the clamping effect of the shoe when it is attached to the tube holder 2, for which purpose the grooves $g$ are provided in each of the outer side walls of the holder to receive the edges $f$ of the clamping shoe 5, in a manner presently to be described. The outer surface $h$ of the shoe may be corrugated as shown, thus giving it better traction facilities.

As before mentioned, and observed at Figs. 1 and 2, the U shaped holder 2 is the only one of the several parts comprising the tire proper that is attached to the metal rim or felly of the wheel. This leaves the sides of such holder free to be expanded so as to receive the pneumatic tube, which may be inflated either before or after it is inserted into the cavity $i$ of the holder, which cavity is seen at Fig. 3, or, it may be partially inflated before inserting into the holder and the operation completed when the shoe is in place, which is effected as follows: After the pneumatic tube is in place—before mentioned—the shoe 5 which will form the circular construction shown in Fig. 10 is expanded over the open mouth $j$ of the holder 2,—Fig. 3—until the edges $f$ of said shoe are brought into the grooves $g$ thereof. The grasping effect of the shoe will be to draw the sides of the holder 2 toward each other and, by so doing, compress the pneumatic tube, causing it to conform to the interior shape of such holder, touching all parts thereof and also the inner surface of the shoe 5, as shown at Fig. 2, so that the whole construction will give under the weight of the rider or exhibit the same elasticity as the ordinary single pneumatic tire. The ordinary tube must necessarily be made sufficiently strong to sustain the compressed air within, and the wear and tear incidental to traction, and is for that purpose generally constructed with alternate layers of canvas or other like material to protect the traction surface against puncture from sharp objects with which it is liable to be brought into contact, and is therefore a very expensive construction, while the pneumatic tube I employ is the ordinary rubber tubing of equal thickness in all of its parts and thereby less expensive than the specially constructed pneumatic tubes above mentioned. The holder 2 is made strong enough to support the pneumatic tube 3 when such tube is inflated, and the heavy rubber shoe will fully meet the requirements for tracking and, combined with the steel sections, will effectually prevent the intrusion of sharp objects that might injure the pneumatic tube, and these steel sections as before mentioned are so short, combined with the loose lapped feature of their edges that the expansible feature of the shoe in attaching it to the holder, or its compressibility due to traction, is not in the least interfered with.

It is generally supposed that the fractures which occur in pneumatic tubes are entirely due to sharp objects with which the tire is brought in contact. On the contrary, and in a majority of cases these fractures take place at the corners or angles formed between the flat surface of the tire when compressed and the side walls. As soon as the slightest split or rupture appears in the outer surface of the tire dust will enter, which, combined with its gritty nature and the continual opening and closing of the crack, however slight, will soon cut through and the patches which are usually cemented over these fractures are short lived in their effect owing to this counteracting influence of the dust. In my construction, the pneumatic tube, owing to the heavy nature of the overlying clamping shoe, will not be subject to the same degree of compression. Besides, the tube being separate from the holder will not be as liable to form those acute angles that produce fracture. When, however, from whatever cause, a leakage is discovered, the rider can, anywhere on the road, remove the clamping shoe and pneumatic tube, repair the rupture, re-inflate the tube, by means of the hand pump, replace the tube and shoe with a loss of only a few moments of time, feeling assured that the repair thus made, is securely protected against the counteracting influence of the dust. If necessary, on very long journeys, an extra tube could be rolled up into a small compass and easily carried.

I do not wish to be confined to the exact construction which I show of the steel sections that are inserted in the flexible clamping shoe. The main feature in their construction is that they be short so as to readily conform to the flexible movements of the shoe, and, that their joints shall be broken so as to form a shield or protector against sharp objects, and these joints can be lapped as shown or linked together in any suitable manner.

Having thus described my invention, what I therefore claim as new, and desire to secure by Letters Patent, is—

1. A bicycle or other wheel of like character comprising in combination with the felly or rim, a holder attached thereto and arranged circumferentially about said rim; a chamber in said holder to receive the pneumatic tube; an opening or mouth therein, a flexible shoe for closing said opening and compressing the sides of said holder toward each other, as set forth.

2. The combination with the rim or felly of a wheel, of a hollow flexible holder arranged circumferentially about the same, an opening in the periphery of said holder which separates that portion projecting from the felly into two parts, a pneumatic-tube, chamber therein, combined with a pneumatic tube arranged to be inserted into such chamber through the open mouth of the holder, and a circumferentially arranged clamping shoe to close the open mouth of the said holder, compressing the sides thereof firmly against the pneumatic tube, and means whereby said shoe is maintained in place, as described.

3. As an improvement in wheels of the character described, a pneumatic tube holder, means for attaching it to the wheel, said holder constructed of a tubular form, with an opening at its outer periphery and extending entirely around the same, so that said opening may be expanded to admit a pneumatic tube, and a chamber within said holder to receive said tube, as shown.

4. The combination with the wheel, its rim or felly; pneumatic tube holder and pneumatic tube arranged as shown, of a flexible circumferentially arranged clamping and treading shoe; said shoe carrying short metal sections whose edges are lapped or otherwise engaged so as not to interfere with the flexibility of the said shoe, said shoe arranged to span the open mouth of the tube holder, compressing the sides thereof against the said pneumatic tube, and means substantially as shown for maintaining said shoe in place.

5. In combination with the wheel, the pneumatic tube and its holder arranged substantially as shown and for the purpose described, of the elastic combined clamping and traction shoe, arranged to be readily attached and detached from said holder and means for firmly securing them together, for the purpose set forth.

Signed at New Haven, in the county of New Haven and State of Connecticut, this 27th day of January, A. D. 1893.

JOSEPH P. LAVIGNE.

Witnesses:
WILBUR F. DAY,
LUTHER B. COUCH.